United States Patent [19]

Chang et al.

[11] Patent Number: 4,973,439
[45] Date of Patent: Nov. 27, 1990

[54] PROCESS FOR PREPARING TONER PARTICLES

[75] Inventors: Hui Chang, Pittsford; Jeffrey H. Sokol, Rochester; Joseph L. Leonardo, Penfield, all of N.Y.

[73] Assignee: Xerox Corporation, Stamford, Conn.

[21] Appl. No.: 630,797

[22] Filed: Jul. 13, 1984

[51] Int. Cl.$^5$ .............................................. B29C 47/76
[52] U.S. Cl. .................................. 264/101; 264/105; 264/349
[58] Field of Search .................. 264/142, 151, 176 F, 264/349, 176 R, 211, 237, 78, 101, 102, 105; 425/203; 366/75, 76, 146, 142; 430/109, 137

[56] References Cited

U.S. PATENT DOCUMENTS

| | | | |
|---|---|---|---|
| 3,084,589 | 4/1963 | Doyle | 264/522 |
| 3,156,009 | 11/1964 | Alsys | 425/86 |
| 3,985,348 | 10/1976 | Skidmore | 366/75 |
| 3,989,677 | 11/1976 | Brassat et al. | 264/211 |
| 4,051,212 | 9/1977 | Grigat et al. | 264/211 |
| 4,065,532 | 12/1977 | Wild et al. | 264/211 |
| 4,094,942 | 6/1978 | Nakai et al. | 264/141 |
| 4,100,244 | 7/1978 | Nonaka | 264/211 |
| 4,208,177 | 6/1980 | Allen | 425/404 |
| 4,217,406 | 8/1980 | Tanaka et al. | 430/137 |
| 4,222,982 | 9/1980 | Beatty et al. | 264/211 |
| 4,250,132 | 2/1981 | Beach | 264/211 |
| 4,330,460 | 5/1982 | Hoffend et al. | 430/137 |
| 4,432,924 | 2/1984 | Umehara et al. | 264/211 |

Primary Examiner—Jill Heitbrink
Attorney, Agent, or Firm—E. O. Palazzo; Judith L. Byoriuk

[57] ABSTRACT

Disclosed is an apparatus for obtaining toner particles with improved dispersion of additive components therein comprised of a toner extrusion device containing therein a blending chamber, a screw mixing means, a heating means, a toner supply means, and a means for injecting the additive components into the extrusion device enabling a decrease in the melting temperature of the toner resin particles contained therein.

9 Claims, 2 Drawing Sheets

PROCESS FOR PREPARING TONER PARTICLES

BACKGROUND OF THE INVENTION

This invention is generally directed to an apparatus and process for the preparation of toner particles, and more specifically the present invention is directed to a continuous economical process for the preparation of toner particles wherein there is effected a liquid injection into the toner components during processing thereof, enabling an increase in the viscosity of the toner polymer, in view of the lowering of the melt temperature thereby permitting a more desirable dispersing of the pigment particles therein.

In one embodiment of the present invention, there is provided a continuous process for the preparation of toner particles wherein there is injected into the polymer components selected a liquid with a boiling point below the melt temperature of the toner composition, whereby the liquid vaporizes enabling the absorption of heat generated by the shearing of the polymer melt and thereby desirably lowering the melt temperature of the toner resin particles. Liquid injection is effected in one specific embodiment with a specially designed nozzle means, however other means of injection can be used, which means are appropriately situated in a toner extrusion apparatus. This apparatus allows the continuous automatic control of toner processing parameters including the degree of dispersion of the pigment particles in the toner resin particles. With the selection of such an extrusion apparatus the properties of the toner composition can be determined during the processing thereof eliminating the need for sampling the toner subsequent to its complete preparation, which sampling is usually accomplished with each batch of toner being prepared. A suitable extrusion apparatus and process is described in a copending application U.S. Ser. No. 535,517/83 now abandoned, entitled "Apparatus and Process for Controlling Toner Properties", the disclosure of this application being totally incorporated herein by reference.

Numerous devices and processes are known for effecting the preparation of toner particles. Examples of commercially known processes include the melt blending of the toner components in a Banbury apparatus. Other methods include spray drying, dispersion polymerization, solution polymerization, and the like. Also it is known that toner compositions can be obtained with an extrusion apparatus. An extrusion apparatus and process enables a number of advantages not achievable with the Banbury process in that, for example, extrusion is a continuous rather than batch operation and, the extrusion process is more susceptible to automation, allowing more economical operation.

Moreover, it is known that water injection processes may be used for the purpose of removing undesirable volatile components during the processing of polymer compositions. However, there is no teaching in this prior art as to the concept of selecting liquid injection for the purpose of controlling, for example, the melt temperature of the polymer components needed for obtaining toner compositions, and wherein there results improved pigment dispersion. The prior art is silent with respect to processing toner compositions with a liquid injection means.

Toner compositions selected for causing the development of images in electrostatic imaging systems must be of the proper triboelectric charge in order to achieve high quality developed images of suitable resolution. The triboelectric charge is primarily effected by the degree of dispersion of the pigment particles and/or charge enchancing additives incorporated therein. Dispersion of the pigment particles and internal charging additives is directly dependent on the magnitude of the shear stress and the temperature history of the polymer components during the melt mixing processes. Accordingly in most situations a reduction in the polymer melt temperature generates higher stress enabling a more favorable dispersion therein of the pigment particles and the charge enhancing additives. However, in many of the apparatuses and processes described herein for obtaining toner particles, such as the Banbury roll mill, the compounding extruder, and the continuous mixing apparatus, the surface area required for heat transfer to reduce the melt temperature is severely limited.

Thus there remains a need for processes and apparatus for the continuous preparation of toner compositions wherein there can be effected a reduction in the melt temperature of the toner componets. Moreover, there remains a need for a simple, economical extrusion toner processing apparatus wherein the melting temperature of the polymer components can be desirably lowered by a liquid injection process. Further, there continues to be a need for enabling the liquid injection of components into the toner compositions being prepared, and wherein this injection can be effected in a continuous manner during the extrusion process. Moreover, there remains a need for a continuous process and apparatus which will enable increased dispersion of pigment particles, and/or charge enhancing additives into the toner composition components, thereby desirably effecting the resulting triboelectric charge contained on the toner resin particles. Additionally, there continues to be a need for an apparatus and process wherein liquid injection of water, suspensions with pigment particles, and charge enhancing additives, or solution mixtures having incorporated therein charge enhancing additives, can be accomplished in a continuous manner, and wherein the properties of the toner compositions produced may be continuously monitored during processing that is, on line, enabling the necessary adjustments to the equipment to be effected immediately and automatically. Furthermore, there continues to be a need for a process and apparatus which will enable a simple, economical method for continuously monitoring and maintaining the capacitance and conductance values of toner components selected for preparing the toner compositions, and wherein during toner processing there can be injected by a nozzle various components into a toner composition causing the melting temperature thereof to be desirably reduced. Also, there continues to be a need for an apparatus and process which continuously and accurately measures the capacitance, or the amount of pigment particles contained in the toner resin selected, and the conductance, that is the degree of dispersion of the pigment particles in the toner resin particles, which measurements are desirably accomplished on line enabling the automatic adjustment of various processing parameters in order that toner particles of desired properties can be obtained. Additionally, there continues to be a need for the preparation of toner particles by extrusion processes, wherein there is injected various components into the polymer resinous particles, and where toner compositions can be prepared in a continuous manner rather than in batches as is effected with the known Banbury roll mixers, which extrusion apparatus contains as an integral part thereof, a nozzle injecting means, and an optional sensing device. Moreover, there remains a need for a process and apparatus wherein there can be injected into a toner composition aqueous solutions, a suspension containing therein carbon black particles, or charge enhancing additives, a solution having dissolved therein charge enhancing additives, waxes, and the like, desirably enabling the lowering of the melt temperature of the toner composition, and causing the viscosity of the polymer contained therein to increase.

SUMMARY OF THE INVENTION

It is an object of the present invention to provide a continuous process and apparatus which overcomes many of the above-noted disadvantages.

It is yet another object of the present invention to provide a process and apparatus for effecting the continuous injection of various components in a toner composition containing, for example, toner resin particles, and pigment particles.

In another object of the present invention there is provided a continuous process, and apparatus for injecting various components, including charge enhancing additives, and pigment particles, into a toner composition during processing thereof, especially extrusion processing.

In still another object of the present invention there is provided a process and apparatus for measuring on line the capacitance and conductive properties of a composition comprised of polymeric resinous particles and pigment particles, and wherein there is selected a nozzle for injecting various components therein, enabling the lowering of the melt temperature of the toner polymer components.

In a further object of the present invention there is provided a process and apparatus for effecting the injection of aqueous solutions into a toner composition during processing thereof causing a decrease in the melt temperature of this composition.

In yet another object of the present invention there is provided a continuous process and apparatus for the injection of solutions with carbon black particles or charge enhancing additives, suspensions having incorporated therein carbon black particles or charge enhancing additives, waxes, and similar materials, into a toner composition during processing thereof, particularly extrusion processing, causing a lowering of the melt temperature of the composition, thereby allowing the pigment particles or charge enhancing additives to be more effectively dispersed in the toner components.

In yet another object of the present invention there is provided an extrusion process and an extrusion apparatus, wherein there is effected a continuous liquid injection of various components into the toner composition, enabling the resulting toner particles to possess desired triboelectric properties, improved dispersion of pigment particles and charge enhancing additives therein, controlled admixing characteristics, and desirable charge distribution, these compositions being useful for causing the development of images in electrostatographic and printing devices.

These and other objects of the present invention are accomplished by providing a process and apparatus for effecting the injection of various components into a toner composition formulation enabling the lowering of the melt temperature thereof. More specifically, in accordance with one embodiment of the present invention, there is provided a continuous process and apparatus, with an injection means for introducing various components into the toner composition processed in the apparatus, enabling the lowering of the polymer melt temperature, and allowing pigment particles, charge enhancing particles, and the like to be effectively dispersed therein.

In one specific embodiment the present invention is directed to an apparatus for obtaining toner particles having desirably dispersed therein pigment particles, comprising providing a toner processing apparatus, including continuous compounding devices such as extrusion systems, and a means for injecting into the apparatus various components causing a decrease in the melting temperature of the toner polymer composition present in the apparatus. A toner extrusion device that can be selected is described in the copending application mentioned hereinbefore, the disclosure of which is totally incorporated herein by reference. This device is generally comprised of a blending chamber, a screw mixing means, a heating means, a toner supply means, and a sensing device with two electrodes which generate AC signals for measuring the capacitance and conductance values of the components passing therebetween subsequent to mixing in the extrusion blending chamber. In accordance with the process described in the copending application, there is provided an extrusion device followed by adding thereto components of toner resin particles and pigment particles. A sensing head which is an integral part of the extrusion device is comprised of two electrodes. Actuating the electrodes causes an electrical signal to be directed to the toner components. These signals are then directed to a capacitance conductance bridge, and subsequently to a microprocessor and a computer control device in operative relationship with the extrusion apparatus allowing for the automatic on line modifications as appropriate of the extrusion apparatus parameters, thereby resulting in toner particles of desired properties.

BRIEF DESCRIPTION OF THE DRAWINGS

For a better understanding of the present invention and further features thereof, reference is made to the following detailed description of various preferred embodiments wherein.

DESCRIPTION OF THE PREFERRED EMBODIMENTS

Figure 1:
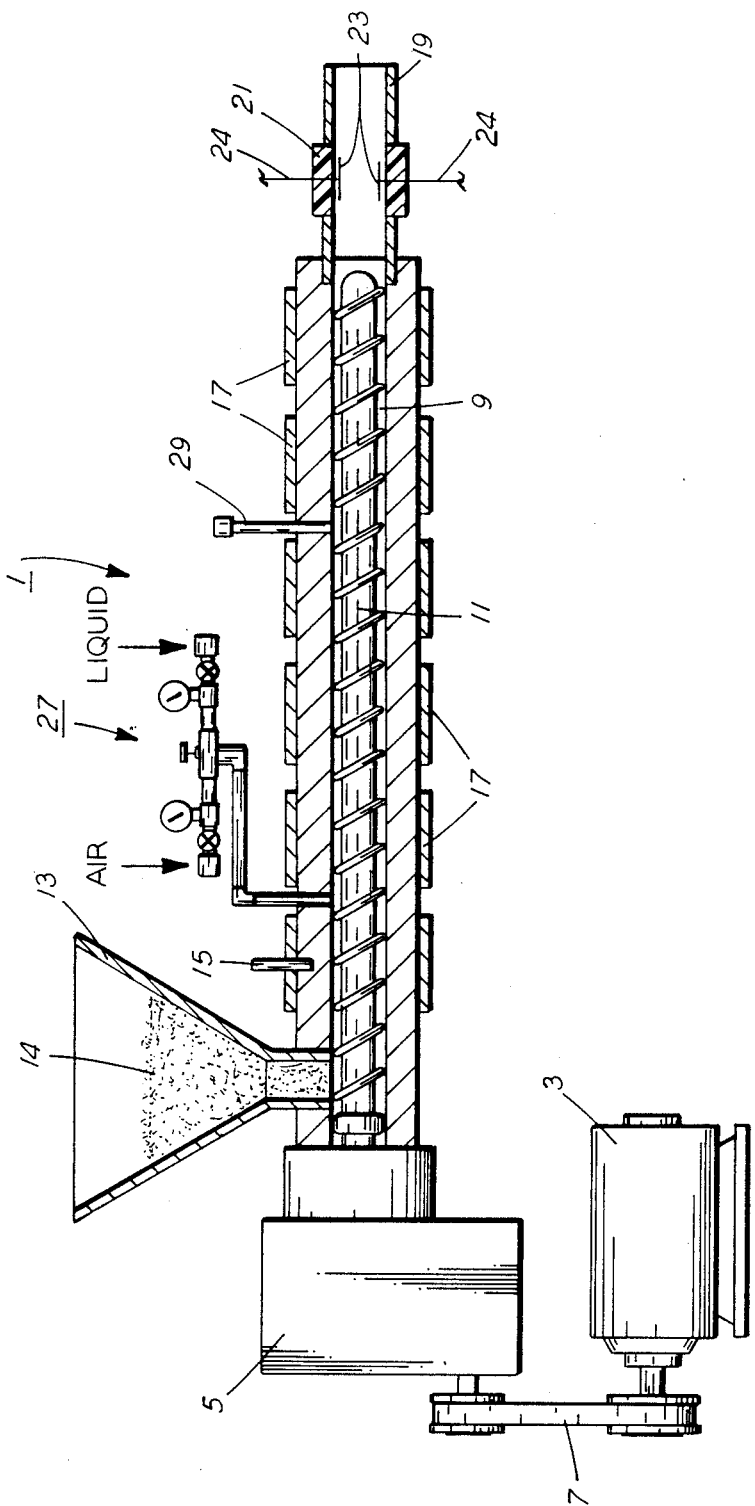
FIG. 1 is a partially schematic cross-sectional view of a toner extrusion apparatus with an injection means.

Illustrated in FIG. 1 is a twin screw extrusion device 1, containing a drive motor means 3, a gear reducer means 5, a belt means 7, a blending chamber 9, a screw means 11, a supply means or hopper 13, with toner resin particles, and pigment particles 14 therein, a thermocouple means 15, a heating means 17, a die or head pressure means 19, an optional sensing head 21, electrodes 23, and lead wires 24, which are connected to a capacitance or conductance type bridge, an injection means 27, and a vacuum extractor 29. In operation the components to be extruded, for example toner resin particles, and pigment particles, enter the extrusion apparatus from the toner supply means 13. These components are blended and thoroughly mixed in chamber 9 by rotation of screw 11. This blending is usually accomplished at elevated temperatures contolled by heating means 17. Subsequent to a suitable effective mixing period the resulting product is directed to the sensing head, and more specifically is caused to pass between the electrodes 23, having applied thereto an alternating current (AC) signal for the primary purpose of measuring the conductance and capacitance values thereof of the product. This information is then generated to other components situated in close proximity to the extrusion apparatus, reference FIG. 2 of the referred to copending application for the purpose of translating the signal into useful information which is interpreted by a computer, automatically providing for adjustments to the toner extrusion process parameters. During extrusion processing there is introduced into the toner formulation subsequent to melting thereof, various components, by the injecting means 27, enabling a reduction in the melt temperature of the toner composition, causing an increase in the viscosity thereof, and the desirable dispersion of pigment particles, for example, therein. This increased dispersion of pigment particles enables a toner composition with various desirable properties including acceptable triboelectric charging values, controlled admix characteristics, suitable charge distribution properties, and the like.

With further reference to FIG. 1 the speed of the screw 11 can be of any suitable value providing the objectives of the present invention are achieved. Generally, however, the speed of screw 11 in one embodiment is from about 100 revolutions per minute to about 250 revolutions per minute. The temperature in the blending chamber 9 can vary, however, generally this temperature, which is controlled by a thermocouple 15 and generated by heating means 17, is from about 50 degrees centigrade to about 120 degrees centigrade. The die or head pressure 19 generates pressure of from about 200 pounds per square inch to about 1,500 pounds per square inch. In one embodiment the screw is allowed to rotate at 200 revolutions per minute, the temperature in the chamber 11 is maintained at 100 degrees centigrade, and the die or head pressure is 200 pounds per square inch.

Parameters associated with the blending chamber, including the amount of polymer resin particles and pigment particles introduced therein can be controlled by means of a computer which receives information from a microprocessor on a continuous basis. The microprocessor is operatively connected to a capacitance, conductance bridge which transmits information to the microprocessor based on data generated from the sensing head 21 connected to the bridge by wires 24. Alternatively, a toner processing device, such as the extrusion apparatus shown in FIG. 1, need not contain a sensing means therein, nor a computer arrangement, rather the process parameters can be adjusted, if appropriate, by sampling the toner composition product obtained subsequent to processing as is commonly affected, for example, with the Banbury mill mixing apparatus.

Figure 2:
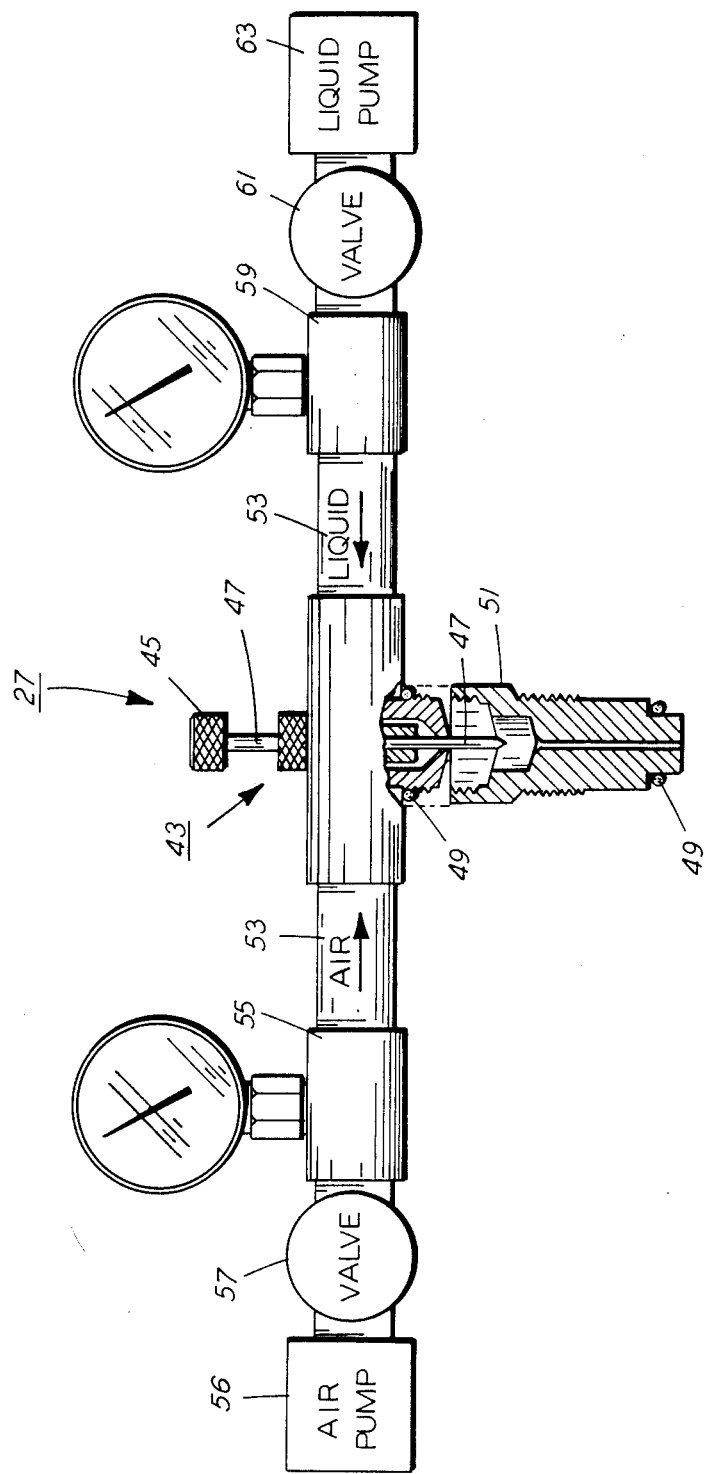
FIG. 2 illustrates in detail a specific nozzle device selected for injection.

Illustrated in FIG. 2 is a specific nozzle means 27 for injecting various components into the toner processing apparatus, which means is suitably anchored to the processing apparatus, and is comprised of a valve 43, a screw adjuster 45, a valve needle 47, seals or O rings 49, a nozzle component 51, operative conduits 53, air pressure gauge 55, air pump means 56, air pressure valve 57 for controlling the flow of air into the nozzle, valve 61 for controlling the flow of components into the nozzle, and pump 63 for introducing the components into the nozzle. In operation, the pump 63 introduces at a suitable pressure controlled by gauge 59, components, such as water, that flow through conduit 53, and are injected into the toner formulation by nozzle 51, and more specifically by needle 47. Pressurized air is introduced into the system for the purpose of preventing needle 47 from clogging. This air is generally not simultaneously introduced with the liquid, rather the valve 61 is closed prior to introducing air into the nozzle chamber.

The injecting means, such as the injecting nozzle of FIG. 2 can be situated at various locations in the toner processing apparatus, providing that the objectives of the present invention are achievable, however, generally the injecting means is located at a position that will allow sufficient time for the toner polymer to achieve melting. In one illustrative embodiment the nozzle is located at a distance on the extrusion apparatus of from about 6 times the diameter to about 8 times the diameter of the screw device. Moreover, there can be selected a multiple number of injecting means, thus more than one nozzle can be located in the toner processing apparatus, and suitably effectively spaced from the first nozzle. For example, with regard to the extrusion device as illustrated in FIG. 1, and assuming a screw length of 8 feet, two nozzles can be positioned and secured thereto with a distance therebetween of about 4 feet.

The injecting means, which is operatively connected to the extrusion apparatus as illustrated, enables the efficient controlled introduction of various components into the toner formulation. These components are injected in the form of a solution enabling the melt temperature of the toner composition to be desirably lowered subsequent to vacuum extraction of vapors with means 29. Generally, the melt temperature of the toner polymer component is reduced 10° F. for each 1 percent of solution component injected therein. More specifically, the melt temperature of the toner polymer component which can initially be from about 330° F. to about 350° F. may be lowered to about 280° F. subsequent to the injection therein of a 5 percent water solution containing charge enhancing additives therein. This lowering of the melting temperature enables a more effective dispersion of the pigment particles present in the toner formulation, and increased dispersion of the charge enhancing additives. The lower melting temperature is caused by evaporation of the components injected into the extrusion device, these components having a lower boiling point than the melting temperature of the toner components. In this manner, upon evaporation and extraction with means 29, heat is extracted from the toner melt causing the temperature to be significantly decreased.

Examples of materials that can be selected for injection into the toner processing apparatus include those components which generally have a boiling point lower than the melt temperature of the polymer components. Accordingly, in one embodiment of the present invention, substances with a boiling point of from about 50° F. to about 240° F., and preferably from about 80° F. to about 220° F. can be used. Thus, various solutions or solution mixtures of components can be injected into the toner formulation. Illustrative examples of these components include water, solution mixtures having present therein pigment particles such as carbon black, solution mixtures having dissolved therein charge enhancing additives, suspension mixtures containing therein pigment particles, suspension mixtures with charge enhancing additives, waxes, and the like. With further reference to the components, the solvent selected for the solution mixture can be comprised of any substance that will affectively dissolve or form dispersions of the pigment particles or charge enhancing additive components present therein. These substances include, for example, water, aliphatic alcohols, such as methanol and ethanol, and the like. Examples of suspsension mediums include those substances which will not effect the dissolution of the pigment particles or charge enhancing additives, illustrative examples of which are organic solvents such as chloroform.

While the components can be introduced into the toner processing apparatus at various selected suitable amounts, providing the objectives of the present invention are achieved, in one embodiment for every 100 pounds per hour of toner formulation processed there is injected therein from about 5 pounds to about 10 pounds of liquid. Thus, for example, a solution mixture comprised of from about 20 percent by weight to about 30 percent by weight of charge enhancing additives is injected into the extrusion device of FIG. 1 at an effective rate, generally of from about 1 to about 10 pounds and preferably from about 3 pounds to about 7.5 pounds per hour.

In one specific sequence of operation there is introduced into the blending chamber of the device of FIG. 1, a toner composition comprised of a copolymer of styrene and n-butyl methacrylate, comprised of 58 percent by weight of styrene and 42 percent by weight of n-butyl methacrylate; or a styrene butadiene resin copolymer, 89 percent by weight of styrene, and 11 percent by weight of butadiene; and 10 percent by weight of carbon black particles. Subsequent to melting of the toner polymer there is introduced therein by the injection nozzle 27, a mixture of water and 3 percent by weight of cetyl pyridinium chloride. Evaporation of the water and extraction of the resulting vapors by vacuum extraction means 29 causes the toner polymer component mixture temperature to be lowered in view of the loss of heat therefrom. Accordingly, in this embodiment, the melt temperature of the toner polymer component in the extrusion apparatus is lowered about 60° F., that is from 350° F. to 290° F., enabling the carbon black particles to be pulverized, and thus more effectively dispersed into the polymer particles. Additionally, the charge enhancing additive is also more effectively dispersed therein.

During the blending operation as accomplished by the rotation of screw 11, the molten toner composition resulting is caused to flow between a pair of electrodes situated in the sensing device whereby the material is subjected to an AC signal. The response signal is read by a capacitance, conductance bridge, which converts such a reading to capacitance and conductance numbers. This data in turn is submitted to a microprocessor and control computer wherein equipment processing adjustments, as appropriate, can be accomplished for the extruding apparatus.

The relationship of the percentage of pigment particles, such as carbon black, or charge enhancing additives, present in the toner resin particles as a function of the capacitance and conductance values during extrusion, is as illustrated in the referred to copending application. For example, a conductance value of 2 nano mhos at a capacitance of 20 picofarads indicates that 10 percent of carbon black particles have been properly dispersed in the toner mixture. Improper dispersion of the pigment particles in the toner resin particles, as is well known, can adversely effect the rate at which toner particles acquire charge, the triboelectric charging values, copy quality, and image resolution. Additionally, undesirable background appears on developed images wherein the carbon black particles, for example, are not uniformly and properly dispersed in the polymer resin particles. The degree of dispersion of pigment particles and charge enhancing additives in the toner resin particles can be determined by known methods, including ASTM designation D2663.

Examples of suitable toner resin selected for processing in accordance with the present invention include polyimides, epoxies, diolefins, polyurethanes, vinyl resins and polymeric esterification products of a dicarboxylic acid and a diol comprising a diphenol. Any suitable vinyl resin may be selected for the toner resins of the present application including homopolymers or copolymers of two or more vinyl monomers. Typical of such vinyl monomeric units include: styrene, p-chlorostyrene, vinyl naphthalene, unsaturated mono-olefins such as ethylene, propylene, butylene, and isobutylene; vinyl halides such as vinyl chloride, vinyl bromide, vinyl fluoride, vinyl acetate, vinyl propionate, vinyl benzoate, vinyl butyrate and the like; vinyl esters such as esters of monocarboxylic acids including methyl acrylate, ethyl acrylate, n-butylacrylate, isobutyl acrylate, dodecyl acrylate, n-octyl acrylate, 2-chloroethyl acrylate, phenyl acrylate, methylalpha-chloroacrylate; methyl methacrylate, ethyl methacrylate, and butyl methacrylate; acrylonitrile, methacrylonitrile, acrylimide; vinyl ethers, such as vinyl methyl ether, vinyl isobutyl ether, vinyl ethyl ether, and the like; vinyl ketones such as vinyl methyl ketone, vinyl hexyl ketone, methyl isopropenyl ketone and the like; vinylidene halides such as vinylidene chloride, vinylidene chlorofluoride and the like; and N-vinyl indole, N-vinyl pyrrolidene and the like; styrene butadiene copolymers, and mixtures thereof.

Various suitable pigment particles can be selected including carbon black, magnetites which consist of a mixture of magnetic oxides, inclusive of the commercially available Mapico blacks, nigrosine dyes, colored pigments such as cyan, magenta, yellow, blue, green, and the like. These pigment particles are present in the toner composition in an amount of from about 3 percent by weight to about 20 percent by weight. When the pigment particles are comprised of magnetites, they are present in the toner composition in the amount of from about 10 percent by weight to about 70 percent by weight, and preferably in an amount of from about 20 percent by weight to about 50 percent by weight.

Illustrative examples of magenta materials that may be selected for incorporation into the toner composition include, for example, 2,9-dimethyl-substituted quinacridone, an anthraquinone dye identified in the color index as Cl 60710; Cl Dispersed Red 15, a diazo dye identified in the color index as Cl 26050; Cl Solvent Red 19, and the like. Illustrative examples of cyan materials that may be used as pigments include copper tetra 4(octadecyl sulfonamido) phthalocyanine; X-copper phthalocyanine pigment listed in the color index as Cl 74160; Cl Pigment Blue; Anthrathrene Blue, identified in the color index as Cl 69810; and Special Blue X-2137. Examples of yellow pigments that may be selected include diarylide yellow 3,3-dichlorobenzidene acetoacetanilides, a monoazo pigment identified in the color index as CI 12700, CI Solvent Yellow 16; a nitrophenyl amine sulfonimide identified in the color index as Foron yellow SE/GLN, CI dispersed yellow 33; 2,5-dimethoxy-4-sulfonanilide phenylazo-4'-chloro-2,5-dimethoxy aceto-acetanilide, perfmanent yellow FGL, and other similar yellows. The pigments of cyan, magenta, and yellow, when used with the charge enhancing additives, are generally present in the toner composition in an amount of from about 2 weight percent to about 15 weight percent based on the weight of the toner resin particles.

Various known suitable effective charge enhancing additives can be selected for incorporation into the toner compositions of the present invention such as quaternary ammonium compounds inclusive of alkyl pyridinium halides; alkyl pyridinium compounds, reference U.S. Pat. No. 4,298,672, the disclosure of which is totally incorporated herein by reference; organic sulfate and sulfonate compositions, U.S. Pat. No. 4,338,390, the disclosure of which is totally incorporated herein by reference; cetyl pyridinium tetrafluoroborates; and the like. These charge enhancing additives are introduced into the toner formulation by the injecting means, and are usually present in the final toner composition in an amount of from about 1 percent by weight to about 20 percent by weight.

Illustrative examples of wax components that can be introduced into the toner formulation are preferably comprised of low molecular weight materials, inclusive of those with a molecular weight of from about 1,000 to about 20,000, including polyethylenes, and polypropylenes.

Thereafter the resulting toner composition can be formulated into a developer composition by mixing with carrier particles. Illustrative examples of carrier particles that can be selected for mixing with the toner composition prepared in accordance with the present invention include those particles that are capable of triboelectrically obtaining a charge of opposite polarity to that of the toner particles. Accordingly, in one embodiment the carrier particles are selected so as to be of a negative polarity in order that the toner particles which are positively charged will adhere to and surround the carrier particles. Illustrative examples of such carrier particles include granular zircon, granular silicon, glass, steel, nickel, iron ferrites silicon dioxide, and the like. Additionally, there can be selected as carrier particles nickel berry carriers as disclosed in U.S. Pat. No. 3,847,604, the disclosure of which is totally incorporated herein by reference, comprised of nodular carrier beads of nickel, characterized by surfaces of reoccurring recesses and protrusions thereby providing particles with a relatively large external area.

The selected carrier particles can be used with or without a coating, the coating generally being comprised of fluoropolymers, such as polyvinylidenefluoride resins; terpolymers of styrene; methylmethacrylate; a silane, such as triethoxy silane; tetrafluoroethylenes; other know coatings and the like.

The diameter of the carrier particles is generally from about 50 microns to about 1,000 microns, thus allowing these particles to possess sufficient density and inertia to avoid adherance to the electrostatic images during the development process. The carrier particles can be mixed with the toner particles in various suitable combinations, however, best results are obtained when about 1 part per toner to about 10 parts to about 200 parts by weight of carrier are mixed.

Examples of toner processing apparatus include continuous compounding devices, such as single screw extruders, and twin screw extruders, continuous mixers, transfer mixers, co-kneaders, and the like, with extrusion apparatuses being preferred.

While it is not desired to be limited by theory, it is believed that a decrease in the melt temperature of the toner composition causes the viscosity of the polymer component to increase significantly, resulting in higher shear, and thus enabling more effective dispersion of the carbon particles or charge enhancing additive components. More specifically, the shear forces cause pulverization of the carbon black particles, for example, to submicron sizes, less than 3 microns enabling better dispersion thereof. As a result, there is obtained toner particles with controlled admix characteristics, stable triboelectric charging values and good charge distribution characteristics. Thus, a toner composition prepared in accordance with the process of the present invention possesses an admix charging rate of less than 5 minutes, as compared to an undesirable admix charging rate of about 15 minutes for a toner composition which does not have injected therein a water solution in accordance with the process described herein.

Although the invention has been described with reference to specific preferred embodiments, it is not intended to be limited thereto, rather those skilled in the art will recognize that variations and modifications may be made therein which are within the spirit of the present invention and within the scope of the following claims.

What is claimed is:

1. An improved process for the continuous and automatic preparation of toner compositions with a mixture of toner resin particles and pigment particles consisting essentially of:
    (1) providing a toner extrusion apparatus containing a venting means,
    (2) adding toner resin particles and pigment particles thereto,
    (3) mixing the toner resin particles and pigment particles in a chamber situated in the extrusion apparatus, which chamber is maintained at a temperature of from about 50° C. to about 120° C.,
    (4) injecting into the extrusion chamber liquid substances with a lower boiling point than the melt temperature of the polymer resin particles,
    (5) directing the resulting mixed material between two electrodes situated in a sensing device whereby the mixture is subjected to an AC signal, and
    (6) converting this signal into useful electronic information, thereby enabling automatic modification of the aforementioned processing parameters.

2. An improved process in accordance with claim 1, wherein the substances injected into the extrusion apparatus are selected from the group consisting of water, a solution of charge enhancing additives, a solution of pigment particles, a suspension having incorporated therein pigment particles, a suspension having incorporated therein charge enhancing additives and a wax.

3. A process in accordance with claim 1 wherein the pigment particles are carbon black.

4. A process in accordance with claim 1 wherein the toner resin particles are selected from the group consisting of styrene-n-butyl methacrylate copolymers and styrene butadiene copolymers.

5. A process in accordance with claim 1 wherein the liquid substances consist of water.

6. A process in accordance with claim 1 wherein the liquid substances consist of a solution mixture of pigment particles.

7. A process in accordance with claim 1 wherein the liquid substances consist of a solution mixture of charge enhancing additives.

8. A process in accordance with claim 7 wherein the charge enhancing additive is an alkyl pyridinium halide.

9. A process in accordance with claim 7 wherein the charge enhancing additive is an alkyl pyridinium tetrafluoborate.

* * * * *